(12) United States Patent
Buchner (10) Patent No.: US 8,253,758 B2
(45) Date of Patent: Aug. 28, 2012

(54) DYNAMICALLY CONFIGURABLE BILINEAR FILTERING SYSTEM

(75) Inventor: Brian Buchner, Oviedo, FL (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 13/366,885

(22) Filed: Feb. 6, 2012

(65) Prior Publication Data
US 2012/0133666 A1    May 31, 2012

Related U.S. Application Data

(62) Division of application No. 12/124,751, filed on May 21, 2008, now Pat. No. 8,154,564.

(51) Int. Cl.
*G09G 5/02* (2006.01)
(52) U.S. Cl. ........ 345/600; 345/581; 345/582; 345/586; 345/589; 345/643; 345/606; 345/609
(58) Field of Classification Search .................. None
See application file for complete search history.

(56) References Cited

U.S. PATENT DOCUMENTS

| | | | | |
|---|---|---|---|---|
| 5,224,208 A * | 6/1993 | Miller et al. | .......... | 345/609 |
| 6,760,036 B2 * | 7/2004 | Tidwell | .......... | 345/600 |
| 7,509,363 B2 * | 3/2009 | Clifton | .......... | 708/277 |
| 7,936,359 B2 * | 5/2011 | Spangler et al. | .......... | 345/606 |

* cited by examiner

*Primary Examiner* — Antonio A Caschera
(74) *Attorney, Agent, or Firm* — Sterne, Kessler, Goldstein & Fox, PLLC (57) ABSTRACT

Apparatus and methods for a bilinear filter system comprising a pre-formatter module, a bilinear module, an accumulator module, and a format module. The pre-formatter module is configured to receive texel data and convert it to a normalized fixed point format. The bilinear module is dynamically reconfigurable to perform an interpolation or an extended precision interpolation on the normalized fixed point texel data from the pre-formatter module and generate re-normalized floating point texel data. The interpolator analyzes the exponent range of fixed point texel data from the pre-formatter module to determine if an extended precision calculation is appropriate. The accumulator module is configured to accumulate floating point texel data from the bilinear module to achieve the desired level of bilinear, trilinear, and anisotropic filtering. The format module is configured to convert texel data from the accumulator module into a standard floating point representation.

12 Claims, 5 Drawing Sheets

DYNAMICALLY CONFIGURABLE BILINEAR FILTERING SYSTEM

CROSS-REFERENCE TO RELATED APPLICATION

This application is a divisional of U.S. application Ser. No. 12/124,751, filed May 21, 2008, (now allowed), which is incorporated by reference herein in its entirety.

BACKGROUND

1. Field of the Invention

The present invention is generally directed to computing operations performed in computing systems, and more particularly directed to graphics processing tasks performed in computing systems.

2. Related Art

A graphics processing unit (GPU) is a complex integrated circuit that is specially designed to perform graphics processing tasks. A GPU may, for example, execute graphics processing tasks required by an end-user application, such as a video game application. In such an example, there are several layers of software between the end-user application and the GPU.

The end-user application communicates with an application programming interface (API). An API allows the end-user application to output graphics data and commands in a standardized format, rather than in a format that is dependent on the GPU. Several types of APIs are commercially available, including DirectX® developed by Microsoft Corp. and OpenGL® developed by Silicon Graphics, Inc. The API communicates with a driver. The driver translates standard code received from the API into a native format of instructions understood by the GPU. The driver is typically written by the manufacturer of the GPU. The GPU then executes the instructions from the driver.

Typically, GPUs also support a concept known as texture filtering. Texture filtering is a method used to determine the texture color for a texture mapped pixel through the use of the colors of nearby pixels of the texture, or texels. The process is also referred to as texture smoothing or texture interpolation. However, high image quality texture filtering requires a high degree of computational complexity.

As an aid to reduce the amount of data needed during texture filtering, a concept of mip mapping is used whereby multiple bitmap versions of the image are stored, each version being encoded and stored at a reduced level of detail. In this manner, as the view of the image is minimized, such as moving away from the image, the displayed image is a version with a reduced level of detail. Because of this reduction in detail, texture filtering can be calculated on a version of the image with a reduced level of detail thereby not increasing the required level of computation as an image is minimized.

The simplest form of texture filtering is referred to as nearest neighbor interpolation which simply returns the color of the texel closest to the center of the requested pixel. While this method requires minimal computation, it also results in a large amounts of "blockiness" during magnification as well as aliasing and shimmering during any type of minification. Nearest neighbor interpolation can also be used with mip mapping, using the nearest mip map level according to the distance from the image. This approach aids in the reduction of aliasing and shimmering, but does not solve blockiness.

In order to solve some of these problems, a bilinear filtering concept is employed whereby instead of relying upon a single texel, the four nearest texels to the pixel in question are sampled and the colors of each texel are combined by a weighted average according to distance. This technique results in a smoothing gradient of color change from one texel to the next, instead of a sudden changer when a pixel center crosses a texel boundary.

However, where the rendering of an image changes from one mip map level to another there tends to be a very noticeable change in the quality at the boundaries between the levels which is not solved using bilinear filtering. In this situation the concept of trilinear filtering is used which involves doing a texture lookup and bilinear filtering on the two closest mip map levels, and then performing a linear interpolation of the results. This results in a smooth degradation of texture quality as distance from the viewer increases, rather than a series of steps.

Anisotropic filtering is typically the highest quality filtering available in consumer based three dimensional graphics cards. Bilinear and trilinear filtering results are correct only when the viewer is looking at the texture perpendicularly. Under these techniques an object will appear blurry when the textured surface is at an oblique angle. Anisotropic filtering corrects this error by sampling in the correct trapezoid shape according to the viewing angle and then trilinearly filtering the results.

While the more sophisticated bilinear, trilinear, and anisotropic filtering techniques produce better results they require higher amounts of computation. In addition, where the dynamic range of sampled texels is large, the required computations typically are done using floating point arithmetic solutions in order to preserve data quality. Floating point calculations require the use of floating point arithmetic logic units within a GPU which increases the associated cost and area required in a circuit to implement.

When an interpolation, such as a bilinear interpolation, is generated using normalized fixed point texel data where the range of data (i.e., the differences between the texel magnitudes) is large, there can be a loss of precision due to the limited number of bits of calculation provided in a single precision bilinear filtering unit. Such a limitation could be overcome by the use of extended precision filtering using multiple single precision bilinear filtering units which would, by operating in parallel on texel data, generate extended precision floating point texel data.

What are needed, therefore, are systems and/or methods to alleviate the aforementioned deficiencies. Particularly, what is needed is a system and method to dynamically determine when an interpolator should generate extended precision results and a bilinear filter system that could generate such results when desired.

BRIEF SUMMARY

Consistent with the principles of the present invention as embodied and broadly described herein, the present invention includes a bilinear filter system comprising a pre-formatter module, a bilinear module, an accumulator module, and a format module. The pre-formatter module is configured to receive texel data and convert it to a normalized fixed point format. A plurality of bilinear modules are dynamically reconfigurable to perform either multiple parallel single-precision bilinear filtering operations, or by acting on common texel data, one multiple-precision bilinear filtering operation. A single precision bilinear filtering operation is not restricted to a particular number of bits of data, but rather may vary according to the floating point format being utilized. The pre-formatter module analyzes the exponent range of floating point texel data to determine if an extended precision calculation is appropriate. If so, the pre-formatter module provides control signals to the set of bilinear filtering modules to cause them to operate in tandem on a single set of texel values, in order to produce a single bilinearly filtered result. The accumulator module is configured to accumulate floating point texel data from the bilinear module to achieve the desired level of bilinear, trilinear, and anisotropic filtering. The format module is configured to convert texel data from the accumulator module into a standard floating point representation.

In another embodiment of the invention where pre-formatter module analyzes the exponent range of fixed point texel data to determine if an extended precision calculation is appropriate and finds that an extended precision calculation is not appropriate, the interpolator performs multiple standard precision calculations. In this embodiment, filters that would have been used in an extended precision interpolation are instead used as additional standard precision, parallel processing, interpolators.

In yet another embodiment the interpolator will perform an extended precision bilinear filtering calculation when the exponent rage of the block of texel data being analyzed is greater than the difference between the number of bits of filtering precision in the bilinear module and the number of bits in a texel data mantissa of the block of texel data.

Further embodiments, features, and advantages of the invention, as well as the structure and operation of the various embodiments of the invention are described in detail below with reference to accompanying drawings.

BRIEF DESCRIPTION OF THE FIGURES

The accompanying drawings, which are incorporated in and constitute part of the specification, illustrate embodiments of the invention and, together with the general description given above and the detailed description of the embodiment given below, serve to explain the principles of the present invention. In the drawings.

DETAILED DESCRIPTION

The present invention relates to a bilinear filtering system with the ability to receive floating point texel data, in a signed or unsigned format. In embodiments of this invention, the interpolator within the bilinear module is dynamically reconfigurable to perform an interpolation in either a standard precision or an extended precision mode on the normalized fixed point texel data from the pre-formatter module. The re-normalization module within the bilinear module accepts the fixed floating point texel data from the interpolator and generates re-normalized floating point texel data.

While specific configurations, arrangements, and steps are discussed, it should be understood that this is done for illustrative purposes only. A person skilled in the pertinent art(s) will recognize that other configurations, arrangements, and steps may be used without departing from the spirit and scope of the present invention. It will be apparent to a person skilled in the pertinent art(s) that this invention may also be employed in a variety of other applications.

It is noted that references in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of one skilled in the art to incorporate such a feature, structure, or characteristic in connection with other embodiments whether or not explicitly described.

While the present invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

Figure 1:
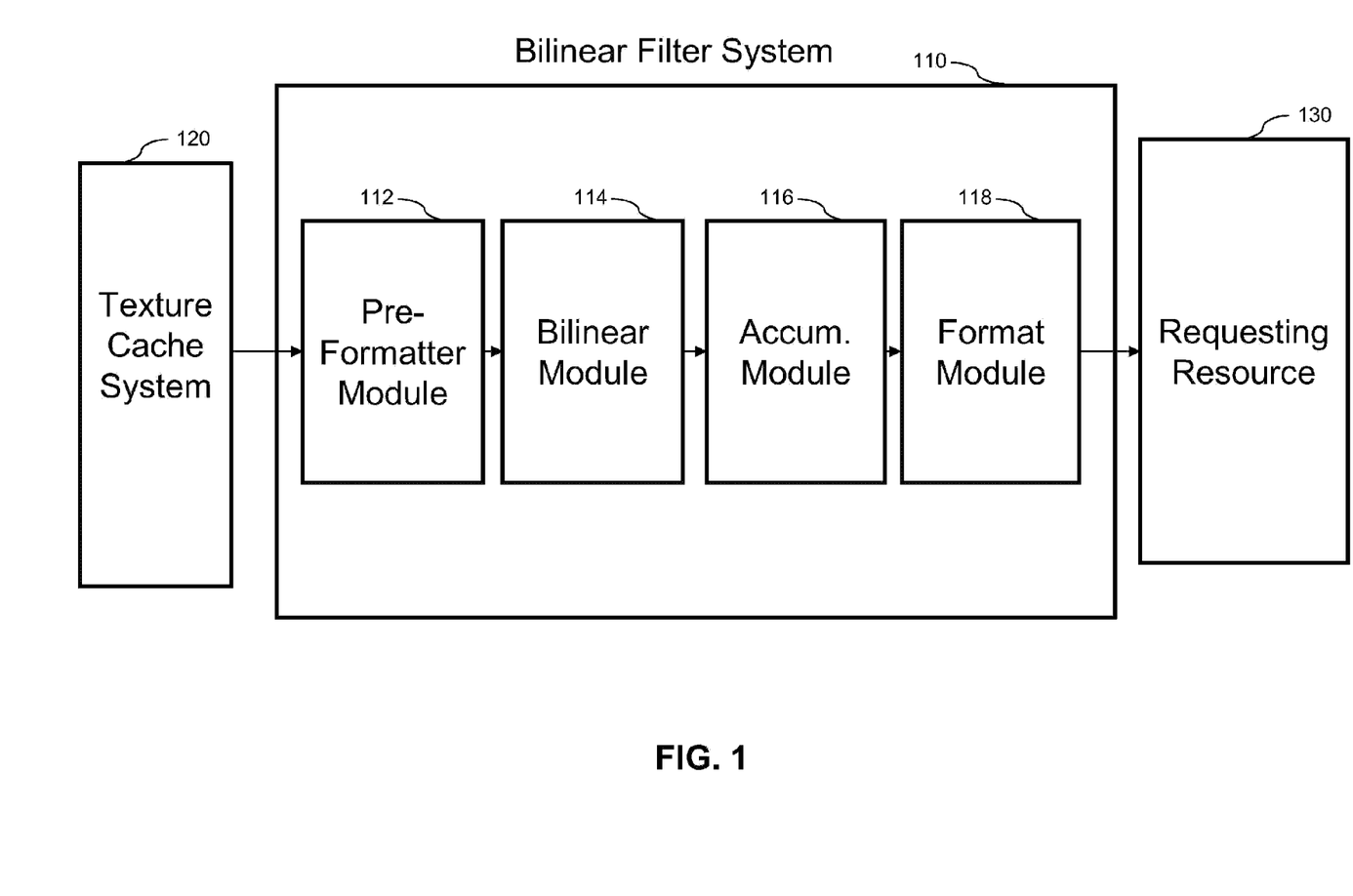
FIG. 1 is a system diagram depicting an implementation of a dynamically configurable bilinear filtering system according to an embodiment of the present invention.

FIG. 1 is an illustration of a bilinear filter 110 according to an embodiment of the present invention. Bilinear filter system 110 receives texel data from texture cache system 120 and, after the data is processed, presents the texel data back to the requesting resource 130. Bilinear filter system 110 comprises a pre-formatter module 112, a bilinear module 114, an accumulator module 116, and a format module 118. Pre-formatter module 112 is configured to receive texel data and performs a block normalization to generate normalized fixed point texel data. Bilinear module 114 receives the normalized fixed point texel data and performs one or more interpolations. Each of these interpolations is accumulated in accumulator module 116, to achieve the desired level of bilinear, trilinear, and anisotropic texture filtering. Format module 118 converts the accumulated texel data from accumulator module 116 to a standard floating point representation for the requesting resource 130.

Figure 2:
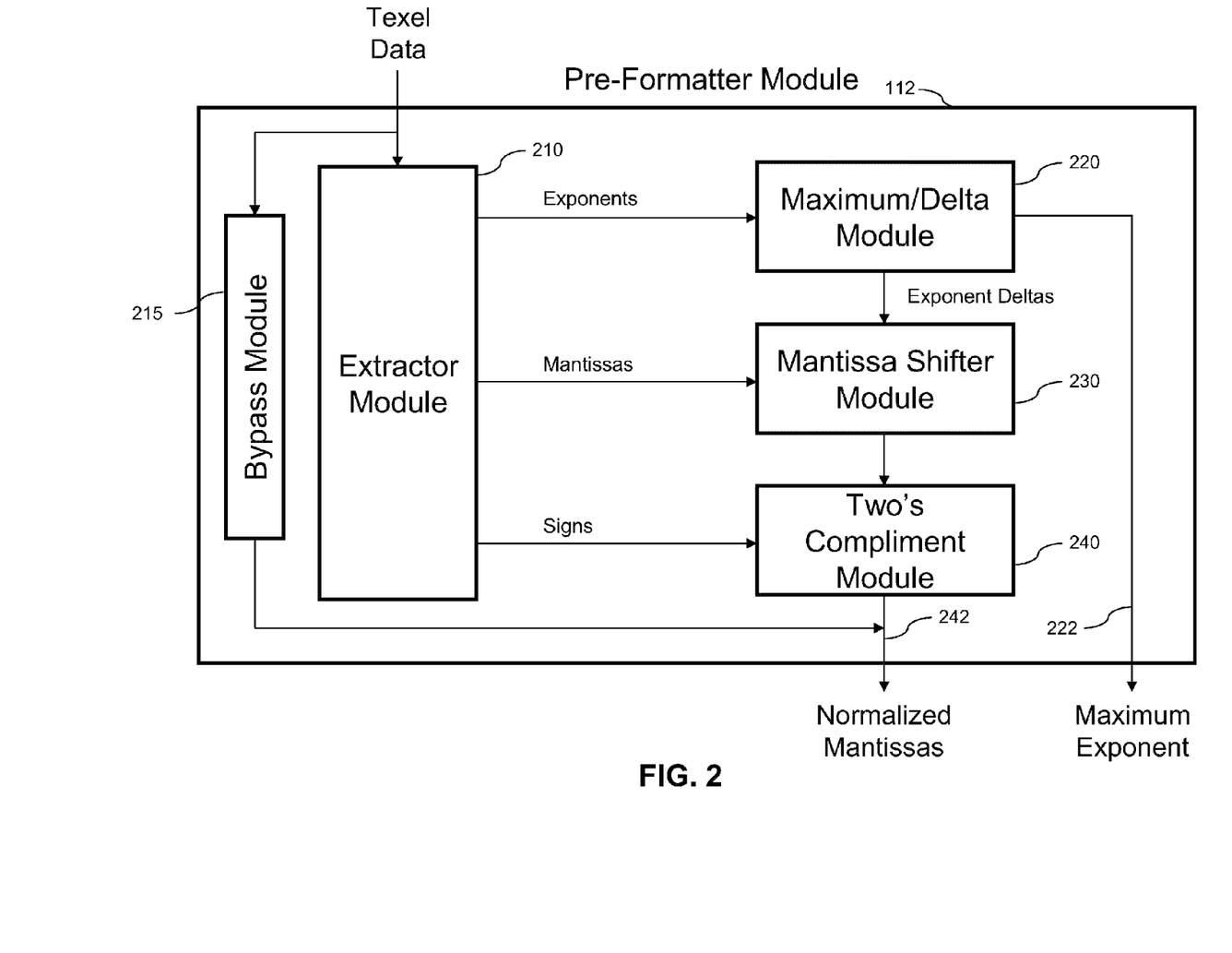
FIG. 2 is a system diagram depicting a pre-formatter module in an implementation of a dynamically configurable bilinear filtering system according to an embodiment of the present invention.

FIG. 2 illustrates the components that comprise pre-formatter module 112 within bilinear filter system 110 according to an embodiment of the present invention. Pre-formatter module 112 is configured to receive texel data in a floating point or fixed point format. In addition, texel data may be signed or unsigned. However, pre-formatter module 112 treats floating point texel format data differently than fixed point texel format data. Symbolically, floating point data can be represented as $(m \cdot b^e)$ where m is the mantissa, b is the base of the number, and e is the exponent. In the case of fixed point data there are a certain number of digits after, and/or before the decimal point, but there is no base value or exponent value. Therefore, fixed format texel data is multiplexed directly using bypass module 215 to normalized mantissas 242 output without further processing by extractor module 210, maximum/delta module 220, mantissa shifter module 230, and two's compliment module 240 In the case of a floating point texel, extractor module 210 will capture the mantissa value, the exponent value, and the sign of incoming texel data.

In one embodiment, pre-formatter module 112 receives a block of texel data including floating point texel data representing four texels. In the case where pre-formatter module 112 receives a block of floating point texel data, extractor module 210 will extract the mantissas, exponents, and signs associated with each texel. The exponents of the floating point texels are received by maximum/delta module 220. Maximum/delta module 220 provides two functions. First, within the block of floating point texels received by pre-formatter module 112, the maximum/delta module 220 identifies the exponent of maximum value (most positive). Secondly, maximum/delta module 220 calculates the difference between this maximum exponent and the exponent for each floating point texel value. Then, for each floating point texel mantissa, mantissa shifter module 230 normalizes the mantissa with respect to the exponent of maximum value. This normalization is accomplished by shifting the mantissa right by the number of bit positions equal to the respective (for that texel) exponent delta calculated by maximum/delta module 220.

In addition, if a floating point texel mantissa is negative, then two's compliment module 240 will convert the shifted negative floating point texel mantissa into an unsigned two's compliment value. In summary, pre-formatter module 112, in the case of receiving a block of floating point texel data, will generate a block of unsigned, normalized mantissa values 242 along with the corresponding maximum block exponent value 222.

Pre-formatter module 112 of FIG. 2 also identifies when an invalid texel value is encountered, including an infinity, undefined, and negative zero. In addition, pre-formatter module 112 will merge a hidden 1 into the mantissa for normalized floating point texel data that does not explicitly represent the leading 1.

Figure 3:
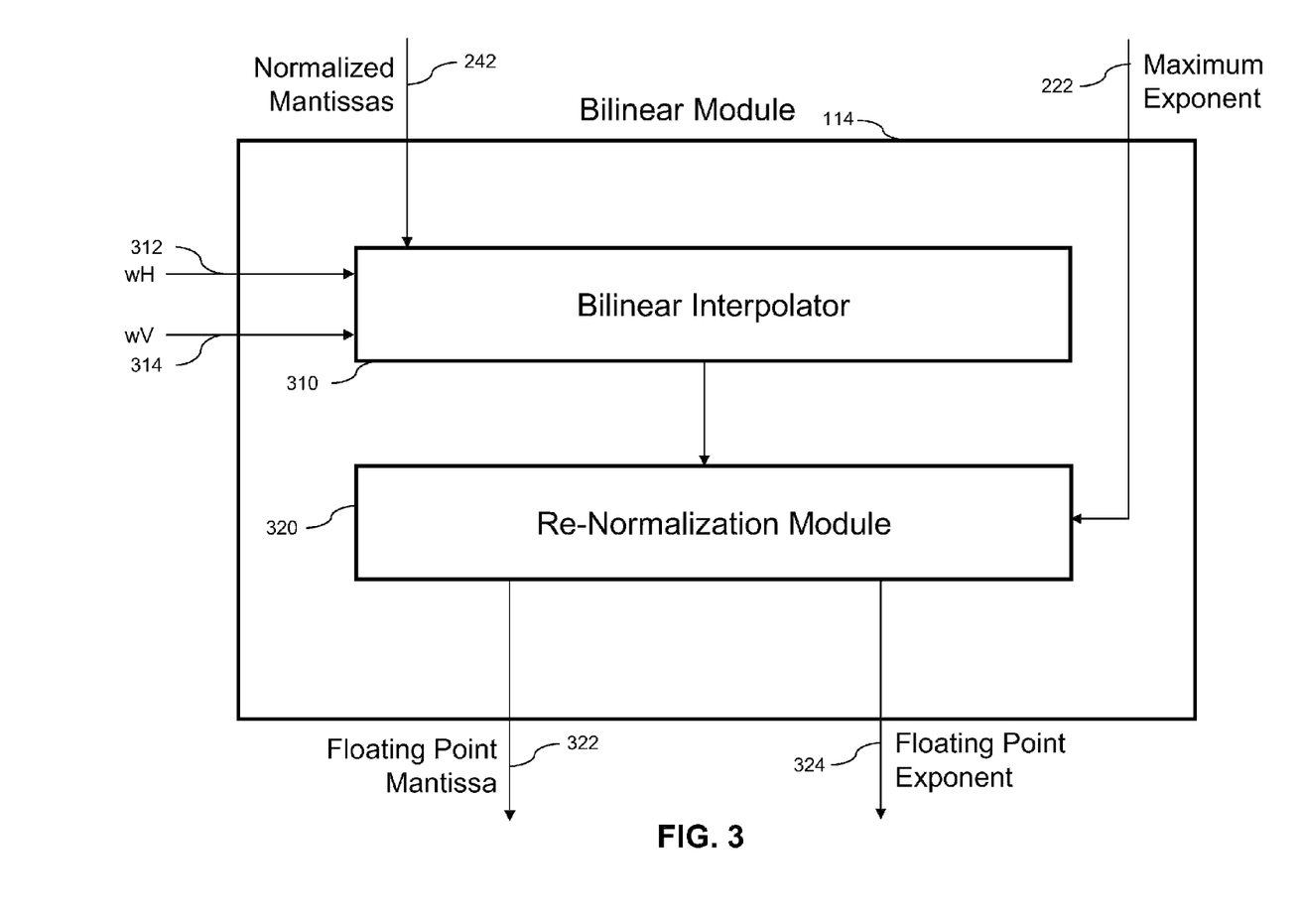
FIG. 3 is a system diagram depicting a bilinear module in an implementation of a dynamically configurable bilinear filtering system according to an embodiment of the present invention.

FIG. 3 is a more detailed illustration of bilinear module 114 within the bilinear filter system 110 according to an embodiment of the present invention. Since pre-formatter module 112 has converted the texel data into a fixed point format, bilinear module 114 does not have to accommodate floating point data while performing interpolations. As shown in FIG. 3, bilinear module 114 comprises bilinear interpolator 310 and re-normalization module 320. Bilinear module 114 receives normalized mantissas 242 and maximum exponent value 222 from pre-formatter module 112. Normalized mantissas 242 are used by bilinear interpolator 310 in performing a bilinear interpolation of the block of normalized mantissas using a weighted algorithm based on horizontal integer weight wH 312 input and vertical integer weight wV 314 input. The results of the interpolation are then sent to re-normalization module 320 which adjusts the maximum exponent value 222 to account for the number of bit positions required when renormalizing the bilinear interpolation result, thereby producing normalized floating point mantissa 322 with floating point exponent 324.

Since bilinear module 114 receives texel data as normalized mantissas 242 and maximum exponent value 222, the precision of normalized mantissas 242 has the possibility of being reduced through the interpolation process in certain circumstances. This situation occurs when the exponent range, defined as the largest delta of the deltas calculated by maximum/delta module 220 in pre-formatter module 112 for a block of texel data, is greater than the excess size of the bilinear filtering width.

In an example, using a bilinear filter with a width of 10 bits (i.e. M=10 where M=the number of bits of bilinear filtering precision), a pre-formatter module 112 receives a block of four texels, each with a mantissa of eights bits (i.e. N=8 where N=the number of bits in a mantissa), as follows (in this example the value of the Exponent "e" is represented in base 10, but this is not to imply or restrict the representation of an exponent, or any other value, in a specific base representation):

|  | Mantissa (m) | Exponent (e) |
|---|---|---|
| Texel 1: | 1.1111111 | 2 |
| Texel 2: | 2.2222222 | 2 |
| Texel 3: | 3.3333333 | 8 |
| Texel 4: | 4.4444444 | 2 |

Maximum/delta module 220 would identify the exponent with the maximum value as that of texel 3 with the value of 8. Next, maximum/delta module 220 calculates the difference between the mantissa exponent and the maximum exponent, 8, for each floating point texel. The result, in this example, is the exponent differences of 6 for texels 1, 2, and 4. Maximum/delta module 220 then normalizes the value within the block of texel data by shifting right in the amount of the calculated delta. Since, in this example, the bilinear filter precision width (M) is 10 bits, the following resulting normalized texel data would appear:

|  | Normalized Mantissa | Maximum Exponent |
|---|---|---|
| Texel 1: | 0.000001111 | 8 |
| Texel 2: | 0.000002222 | 8 |
| Texel 3: | 3.333333300 | 8 |
| Texel 4: | 0.000004444 | 8 |

As shown in the above example, the largest exponent delta has a value of 6 and therefore the exponent range is 6. However, since the excess size of the bilinear filter, defined as the difference is size between the bilinear filter precision width and the width of the mantissa, is 2 (M−N: bilinear filter width of 10 less the mantissa width of 8) while the exponent range is 6, there is a loss of precision of 4 bits (the difference between the exponent range, 6, and the excess size of the bilinear filter, 2).

This loss of precision is shown by the difference in the number of significant bits for each texel. Here texels 1, 2, and 4 indicate 4 significant bits (texel 1-1111; texel 2-2222; texel 4-4444), while texel 3 indicates 8 significant bits (3.3333333), a difference of 4 bits. The loss in the difference of significant bits can be overcome if bilinear interpolator 310 had the ability to utilize additional bilinear filter precision when the exponent range of a block of texel data is greater than the difference between the number of bits of filtering precision in the bilinear module and the number of bits in the texel data mantissa (Exponent Range>[M−N]).

Figure 4:
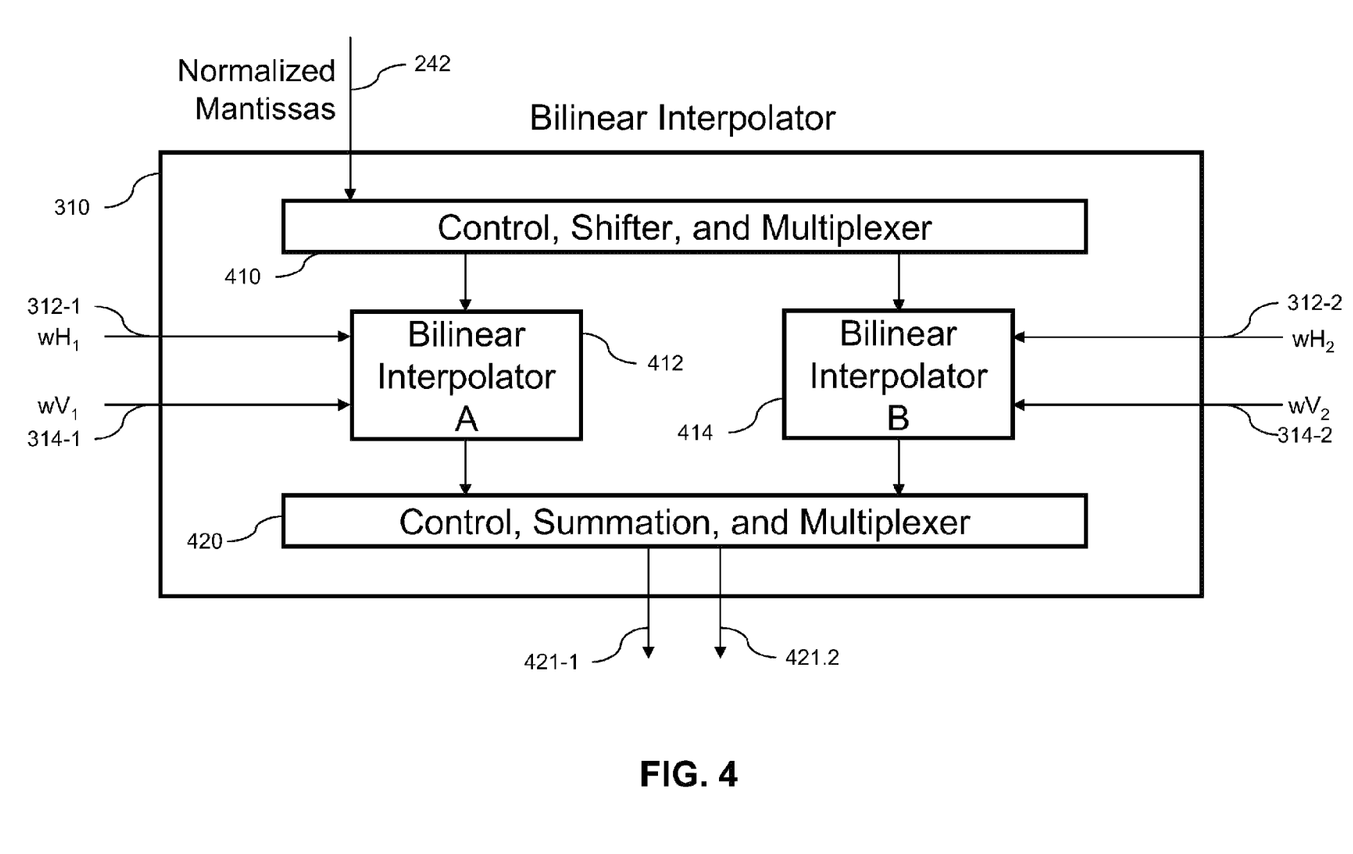
FIG. 4 is a system diagram depicting a bilinear interpolator within a bilinear module in an implementation of a dynamically configurable bilinear filtering system according to an embodiment of the present invention.

FIG. 4 is a more detailed illustration of bilinear interpolator 310 with the ability to be dynamically reconfigured for extended precision according to an embodiment of the present invention. Bilinear interpolator 310 comprises input control, shifter, and multiplexer 410, dual bilinear interpolators, A 412 and B 414, and output control, summation, and multiplexer 420. Bilinear interpolator 310 may operate in either a "standard" precision mode where, as an example, two blocks of normalized mantissas 242 are presented to bilinear interpolator 310. Input control, shifter, and multiplexer 410 will pass one block to bilinear interpolator A and the other block to bilinear interpolator B.

In this "standard" precision mode bilinear interpolator A 412 and bilinear interpolator B 414 act independently. Bilinear interpolator A 412 utilizes the horizontal and vertical weights, $wH_1$ 312-1 and $wV_1$ 314-1 whereas bilinear interpolator B 414 utilizes the horizontal and vertical weights, $wH_2$ 312-2 and $wV_2$ 314-2. Output control, summation, and multiplexer 420 will keep the results of bilinear interpolator A 412 and bilinear interpolator B 414 separate and distinct, outputting the bilinear filter results of bilinear interpolator A 412 through path 421-1 and bilinear interpolator B 414 through path 421-2. In the "standard" precision mode, bilinear interpolator 310 produces two bilinear filtered results per cycle.

However, when input control, shifter and multiplexer 310 inspects a incoming pair of normalized mantissas 242 where the exponent range exceeds a certain threshold, for example as in the example previously presented when the exponent range of a block of texel data is greater than the difference between the number of bits of filtering precision in the bilinear module and the number of bits in the texel data mantissa, the input control, shifter and multiplexer 310 would allow just a single bilinear interpolator operation to occur whereby both bilinear interpolator A 412 and bilinear interpolator B 414 are used in an "extended" precision mode. In this manner the bilinear filter precision width is doubled to 2M where M is the number of bits of precision in a single bilinear interpolator.

Therefore, in a double bilinear interpolator embodiment there is no loss of precision where the exponent range is less than twice the filter precision width of a single bilinear interpolator, assuming the widths of the interpolators are equal, less the width of the texel mantissa. This example of a double bilinear interpolator is not meant to limit the implementation of an extended precision bilinear interpolator as other embodiments could be implemented using any number of bilinear interpolators.

When the input control, shifter, and multiplex 410 identifies an incoming pair of normalized mantissas 242 where the exponent range exceeds a certain threshold, it will multiplex the most significant bits of the mantissa into a bilinear interpolator, for example into bilinear interpolator B 414, and the least significant bits of the mantissa into the other bilinear interpolator, for example into bilinear interpolator A 412. In an extended precision mode the horizontal weights applied to bilinear interpolator A 412 and bilinear interpolator B 414 must be equivalent as the same weighting factor must be applied to all of the mantissa bits representing a particular texel. In the same manner, the vertical weights must also be equivalent. Therefore, in this dual bilinear interpolator example, horizontal weight $wH_1$ 312-1 is equal to $wH_2$ 312-2, and vertical weight $wV_1$ 314-1 is equal to $wV_2$ 314-2.

Once bilinear interpolator A 412 and bilinear interpolator B 414 complete an interpolation cycle, the results are presented to output control, summation and multiplexer 420. In the situation where there has just been an extended precision interpolation performed, output control, summation and multiplexer 420 will sum the results of bilinear interpolator A 412 and bilinear interpolator B 414, shifting the least significant bits left by the width of a single precision interpolator (M), thereby producing a single bilinear filtered result mantissa of double precision which is then output on either path 421-1 or 421-2 as desired.

Figure 5:
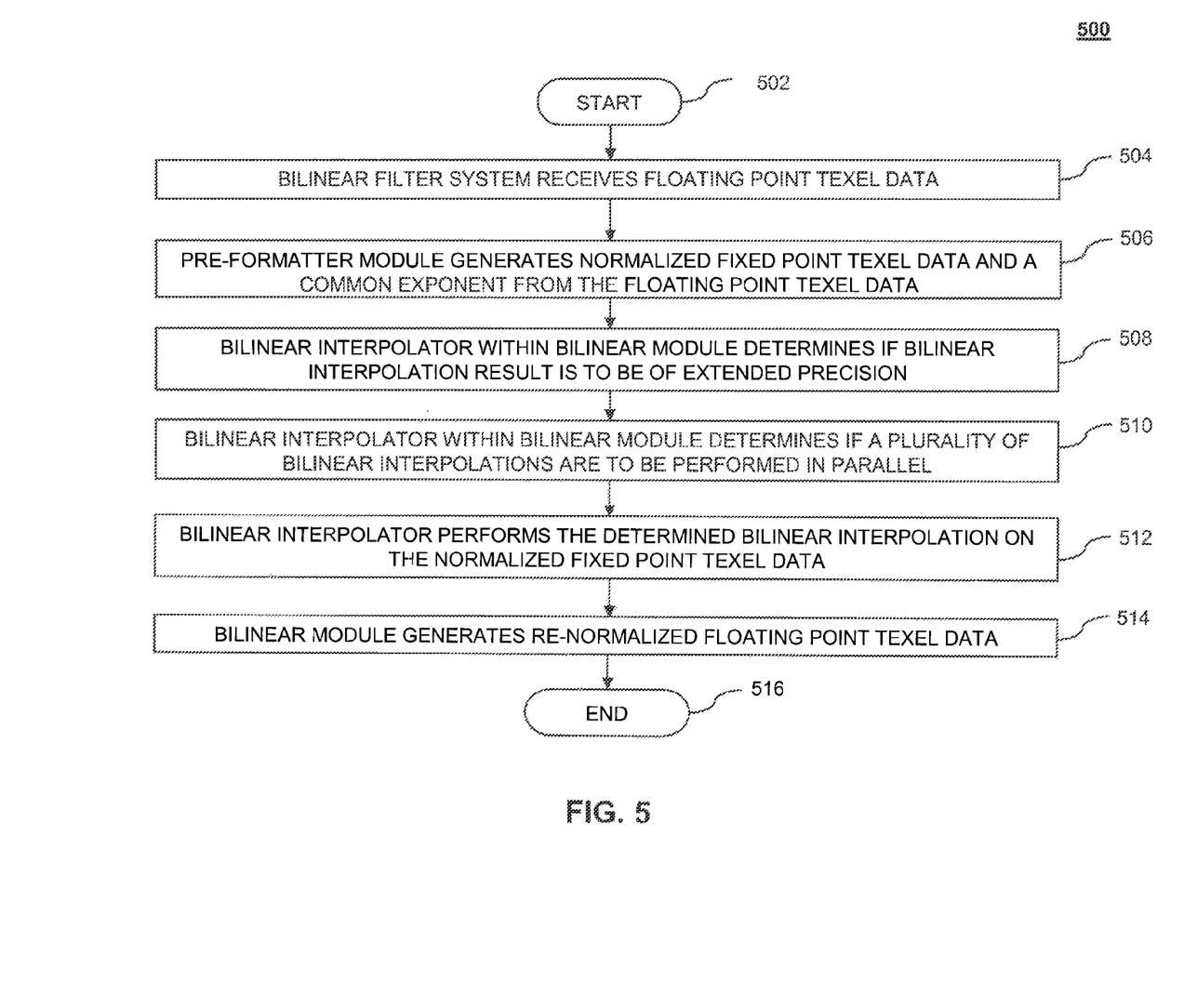
FIG. 5 is a flowchart depicting an implementation of a method whereby a bilinear filter system is dynamically configured according to an embodiment of the present invention.

FIG. 5 is a flowchart depicting a method 500 for dynamically configuring a bilinear filtering system. Method 500 begins at step 502. In step 504, a bilinear filter system receives a block of floating point texel data as a result of a requesting resource issuing a texture request. In step 506, the pre-formatter module generates normalized fixed point texel data and a common, highest, exponent from the block of floating point texel data.

In step 508, the bilinear interpolator within the bilinear module determines if a bilinear interpolation result needs to be one of extended precision. In step 510 the bilinear interpolator within the bilinear module determines if a plurality of bilinear interpolations are to be performed in parallel. In step 512, the bilinear interpolators perform the determined bilinear interpolations, in standard precision, extended precision, and in parallel, on the normalized fixed point texel data. In step 514, the bilinear module re-normalizes the floating point texel data. Method 500 completes at step 516.

The functions, processes, systems, and methods outlined in FIGS. 1, 2, 3, 4, and 5 can be implemented in software, firmware, or hardware, or using any combination thereof. If programmable logic is used, such logic can execute on a commercially available processing platform or a special purpose device.

As would be apparent to one skilled in the relevant art, based on the description herein, embodiments of the present invention can be designed in software using a hardware description language (HDL) such as, for example, Verilog or VHDL. The HDL-design can model the behavior of an electronic system, where the design can be synthesized and ultimately fabricated into a hardware device. In addition, the HDL-design can be stored in a computer product and loaded into a computer system prior to hardware manufacture.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A method comprising:

receiving, using a processor, floating point texel data;

generating, using the processor, normalized fixed point texel data from the floating point texel data;
determining, using the processor, if an interpolation result is to be one of extended precision;
performing, using the processor, the determined interpolation on the normalized fixed point texel data; and
generating, using the processor, re-normalized floating point texel data.

2. The method of claim 1, further comprising determining if a plurality of interpolation results are to be performed in parallel.

3. The method of claim 1, wherein generating normalized fixed point texel data further comprises:
   extracting a sign, an exponent, and a mantissa from the floating point texel data;
   identifying if an infinity, undefined, and negative zero exist in the floating point texel data;
   merging a hidden 1 into the mantissa for normalized floating point texel data;
   two's complementing a negative mantissa; and
   applying a block normalization wherein (i) a largest exponent is identified and (ii) a delta is calculated between each exponent and the largest exponent, the mantissa being shifted right by the delta.

4. The method of claim 1, wherein interpolation further comprises:
   performing an interpolation on the fixed point texel data using a horizontal weight and a vertical weight; and
   re-normalizing the fixed point texel data to floating point texel data.

5. The method of claim 1, wherein interpolation further comprises:
   producing a bilinear texture filter;
   producing a trilinear texture filter; and
   producing an anisotropic texture filter.

6. The method of claim 1, wherein the method is performed by synthesizing hardware description language instructions.

7. A system comprising:
   a processor; and
   a memory in communication with said processor, said memory for storing a plurality of processing instructions for directing said processor to:
      receive floating point texel data;
      generate normalized fixed point texel data from the floating point texel data;
      determine if an interpolation result is to be one of extended precision;
      determine if a plurality of interpolation results are to be performed in parallel;
      perform the determined interpolation on the normalized fixed point texel data; and
      generate re-normalized floating point texel data.

8. The system of claim 7, wherein the processing instructions directing the processor to generate the normalized fixed point texel data further comprises processing instructions for directing said processor to perform:
   extracting a sign, an exponent, and a mantissa from the floating point texel data;
   identifying if an infinity, undefined, and negative zero exist in the floating point texel data;
   merging a hidden 1 into the mantissa for normalized floating point texel data;
   two's complementing a negative mantissa; and
   applying a block normalization wherein:
      a largest exponent is identified;
      a delta is calculated between each exponent and the largest exponent; and
      the mantissa is shifted right by the delta.

9. The system of claim 7, wherein the processing instructions directing the processor to perform interpolation further comprises processing instructions for directing said processor to perform:
   an interpolation on the fixed point texel data using a horizontal weight and a vertical weight; and
   re-normalizing the fixed point texel data to floating point texel data.

10. The system of claim 7, wherein the processing instructions directing the processor to perform interpolation further comprises processing instructions for directing said processor to perform:
   producing a bilinear texture filter;
   producing a trilinear texture filter; and
   producing an anisotropic texture filter.

11. A non-transitory computer readable medium carrying one or more sequences of one or more instructions for execution by one or more processors to perform a method for dynamically configuring a bilinear filtering system, comprising:
   receiving floating point texel data;
   generating normalized fixed point texel data from the floating point texel data;
   determining if an interpolation result is to be one of extended precision;
   performing the determined interpolation on the normalized fixed point texel data; and
   generating re-normalized floating point texel data.

12. The non-transitory computer readable medium method of claim 11, wherein the generating normalized fixed point texel data further comprises:
   extracting a sign, an exponent, and a mantissa from the floating point texel data;
   identifying if an infinity, undefined, and negative zero exist in the floating point texel data;
   merging a hidden 1 into the mantissa for normalized floating point texel data;
   two's complementing a negative mantissa; and
   applying a block normalization wherein (i) a largest exponent is identified and (ii) a delta is calculated between each exponent and the largest exponent, the mantissa being shifted right by the delta.

* * * * *